United States Patent

Bello et al.

[15] 3,689,841

[45] Sept. 5, 1972

[54] COMMUNICATION SYSTEM FOR ELIMINATING TIME DELAY EFFECTS WHEN USED IN A MULTIPATH TRANSMISSION MEDIUM

[72] Inventors: Phillip A. Bello, Needham Heights; Howard C. Salwen, Newtonville, both of Mass.

[73] Assignee: Signatron, Inc., 2, Lexington, Mass.

[22] Filed: Oct. 23, 1970

[21] Appl. No.: 83,472

[52] U.S. Cl.............325/39, 179/15 BM, 179/15 BC, 179/15 BS, 179/15 FS, 325/30, 325/40, 325/50, 325/56, 325/60, 325/65, 332/22, 332/45

[51] Int. Cl...............................................H04b 1/00

[58] Field of Search................179/15 BM, 15 BC, 15 FS; 325/39, 40, 47, 56, 60, 50, 33, 34, 30, 163, 320, 65; 332/22, 47, 45

[56] References Cited

UNITED STATES PATENTS

| | | | |
|---|---|---|---|
| 3,337,691 | 8/1967 | Litchman | 179/15 BM |
| 3,299,357 | 1/1967 | Darlington | 179/15 BM |
| 2,889,521 | 6/1959 | Levine et al. | 325/47 |
| 2,878,318 | 3/1959 | Leek | 179/15 BM |
| 3,529,088 | 9/1970 | Haur | 179/15 BM |
| 3,523,250 | 8/1970 | Branham | 325/40 |
| 3,532,988 | 10/1970 | Magnuski | 325/56 |
| 3,226,644 | 12/1965 | Goode et al. | 325/56 |

*Primary Examiner*—Albert J. Mayer
*Attorney*—Roberts, Cushman & Grover

[57] ABSTRACT

A communication system for providing effective multipath transmission without intermodulation or other distortion effects normally arising from the transmission through a dispersive medium, such as multipath troposcatter communication links. In the invention the analog information is used to phase or amplitude modulate a transmitter signal and digital information is used to frequency and phase modulate such signal in a hybrid modulation process which is readily adapted to permit alternate analog and digital modulation, simultaneous analog and digital modulation, or sole analog or sole digital modulation over periodically occurring frame intervals of time. At the receiver the multipath signal is appropriately gated to select only those portions of the received signal which are the least affected by time delays introduced by the multipath transmission, such selected portions being demodulated to reconstruct the analog and digital information which has been transmitted.

14 Claims, 17 Drawing Figures

COMMUNICATION SYSTEM FOR ELIMINATING TIME DELAY EFFECTS WHEN USED IN A MULTIPATH TRANSMISSION MEDIUM

This invention relates generally to communication systems and, more particularly, to communication systems for use in transmitting analog information, or combined analog and digital information, through a dispersive transmission medium, such as a fading multipath medium.

In multipath transmission systems, such as those which utilize troposcatter communication links, for example, the transmission of information, particularly in analog form, is usually difficult to perform effectively. Thus, in presently known systems which utilize frequency modulated transmitter signals for such analog information, undesirable intermodulation effects introduced by the multipath transmission medium tend to obliterate the information content of the signal and make its clear reproduction at the receiver extremely difficult.

This invention utilizes a technique for producing an appropriate transmitter signal containing analog information and for reproducing such signal at the receiver substantially without intermodulation, or other distortion, effects which results from the multipath characteristics of the transmission medium. Moreover, the technique involved is readily adapted to the transmission of digital information so that both analog and digital information can be effectively combined by the techniques of the invention to produce a suitable hybrid communication system.

In accordance with the invention, as particularly directed to the transmission of analog information, such information is periodically sampled at known discrete time intervals and the sampled amplitude is held at the sampled value for the duration of each such time interval. Thus, a signal in the form of a sequence of rectangular pulses having different amplitudes corresponding to the sampled amplitudes is generated from the continuously varying analog signal. Such pulse signal is thereupon utilized to phase or amplitude modulate an appropriate carrier signal, the phase or amplitude of which corresponds to the amplitude of each pulse, which modulated signal is then suitably transmitted through the multipath transmission channel.

The transmitted signal is conveyed through the multipath medium along a plurality of paths of differing lengths so that a plurality of signals each representing the transmitted signal but having varying energy contents are received at the receiver at different times depending on the length of each particular transmission path in the medium, as is well known. Such multipath signals are effectively combined in the transmission medium to produce a signal at the receiver which is inevitably distorted because it is made up of the combination of each of the various time delayed signals. In the invention the received signal is thereupon demodulated in a manner which avoids such distortion effects and permits the recovery of the desired phase or amplitude information contained therein as is needed to reconstruct the analog information. If the time interval utilized for the pulses of the pulse amplitude modulated signal in the transmitter is sufficiently long in comparison with the time delay introduced by the longest effective path encountered in the multipath medium, it is possible to recover such phase or amplitude information by suitably sampling only a portion of the incoming combination received signal during each corresponding pulse time interval by means of a suitably controlled gate. The gate is arranged to pass a portion of the signal during each pulse time interval only at a time sufficiently removed from the leading portion of each said interval in order to avoid the time delay effects of the multipath transmission as described more fully below. The gated portions of the received signal are then appropriately demodulated and used to reconstruct the original analog signal.

Thus, the receiver takes advantage of the fact that at some time following the beginning of each pulse time interval the distortion created by the multipath transmission medium is sufficiently reduced that the value of the received signal has "settled" effectively to its true level.

The receiver must be suitably time synchronized by the characteristics of incoming signal so that the time gate can be triggered at the appropriate time during each pulse time interval of the received signal. The proper operation of the synchronizing system thereby prevents any interference between the values of the signals in each pulse interval and the demodulated signal ultimately used to reconstruct the original analog waveform remains free of intermodulation problems due to the multipath transmission characteristics.

The system is also appropriately adaptable to the transmission of combined analog and digital information by alternating the transmission of analog information with the intervening transmission of digital information which, for example, may be in the form of binary pulses having equal amplitudes and differing only in polarity. Such a hybrid system is discussed in more detail below.

The basic structure and operation of the invention both for the transmission of analog information in a multipath transmission medium and the transmission of analog plus digital information in such a medium can be described in more detail with the help of the accompanying drawings wherein particular embodiments of the invention are shown:

Figure 1:
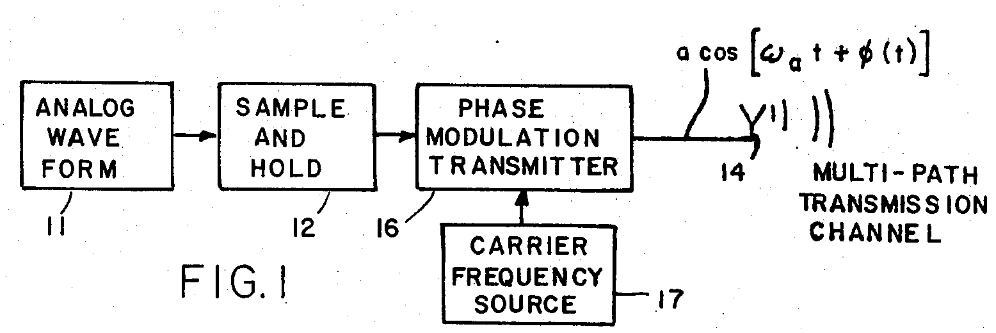
FIG. 1 depicts a block diagram of one particular embodiment of a transmitter system of the invention.
Figure 1A:
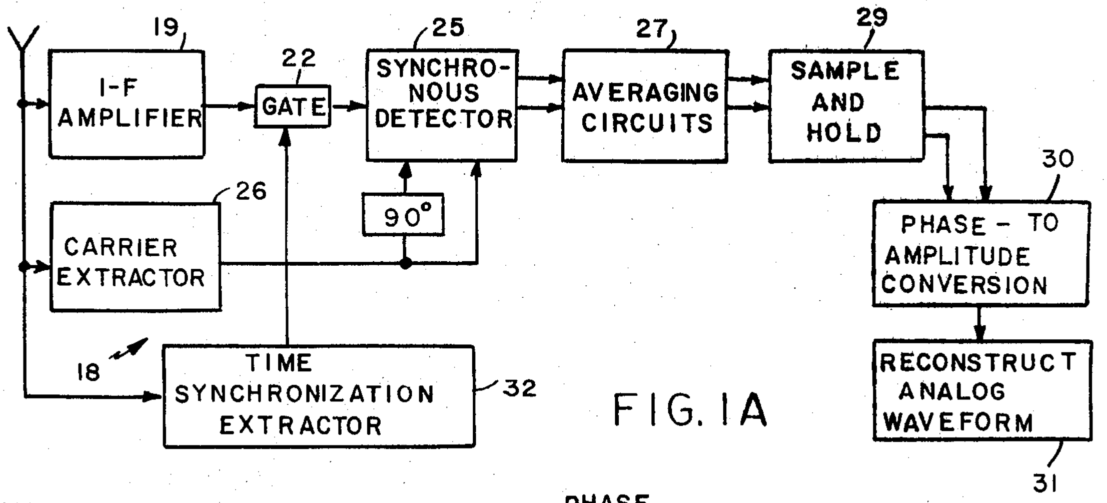
FIG. 1A depicts a block diagram of one particular embodiment of a receiver system of the invention.
Figure 8:
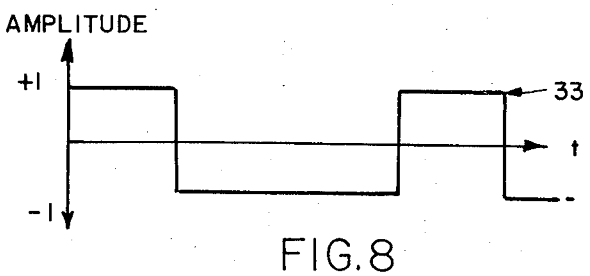
Figure 9:
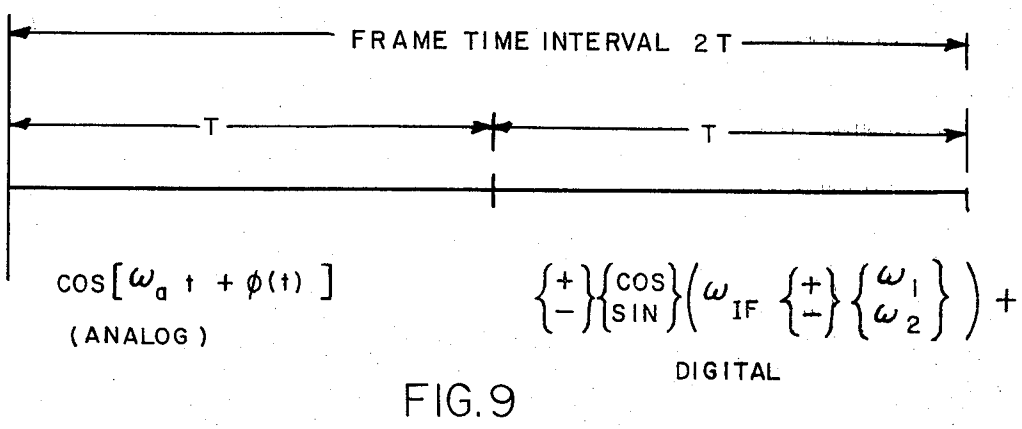
Figure 12:
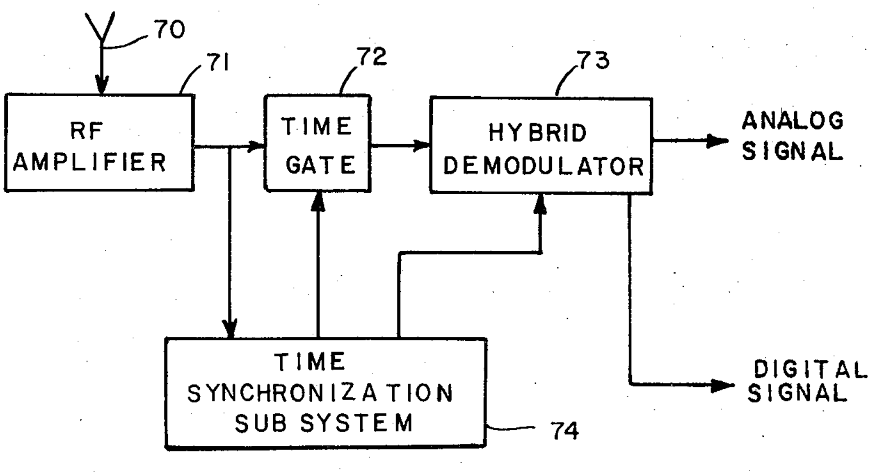
Figure 10:
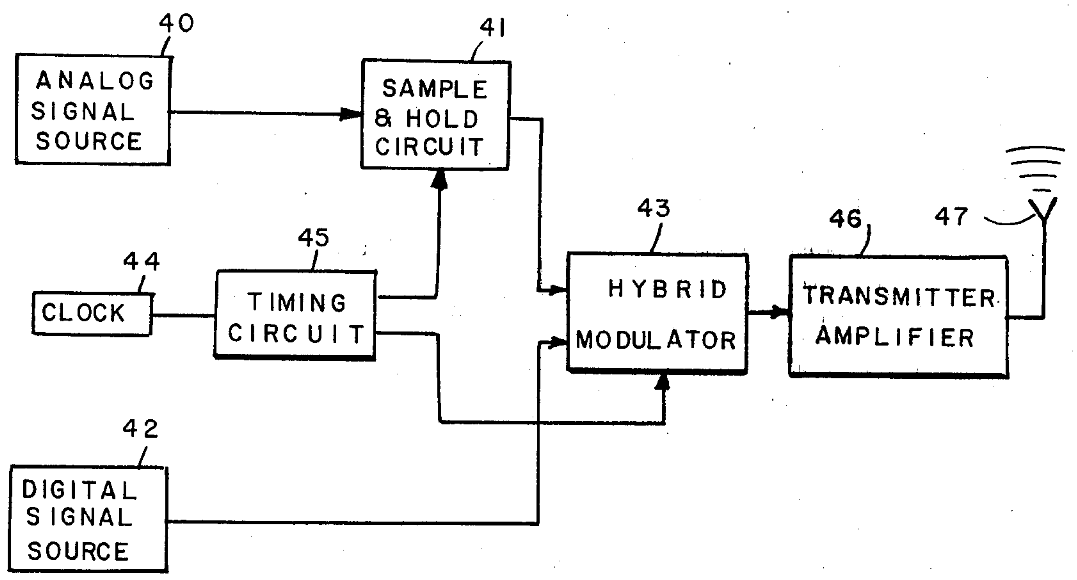
Figure 13:
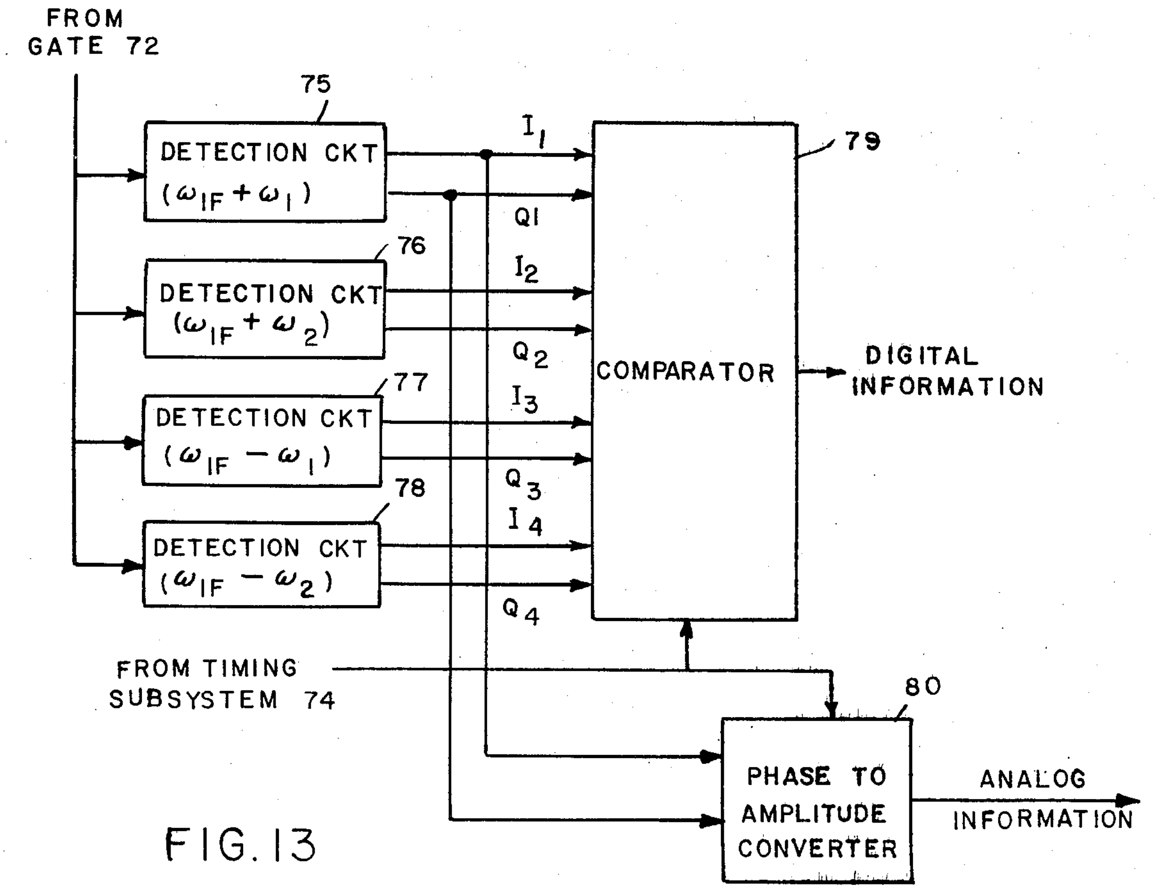
Figure 11:
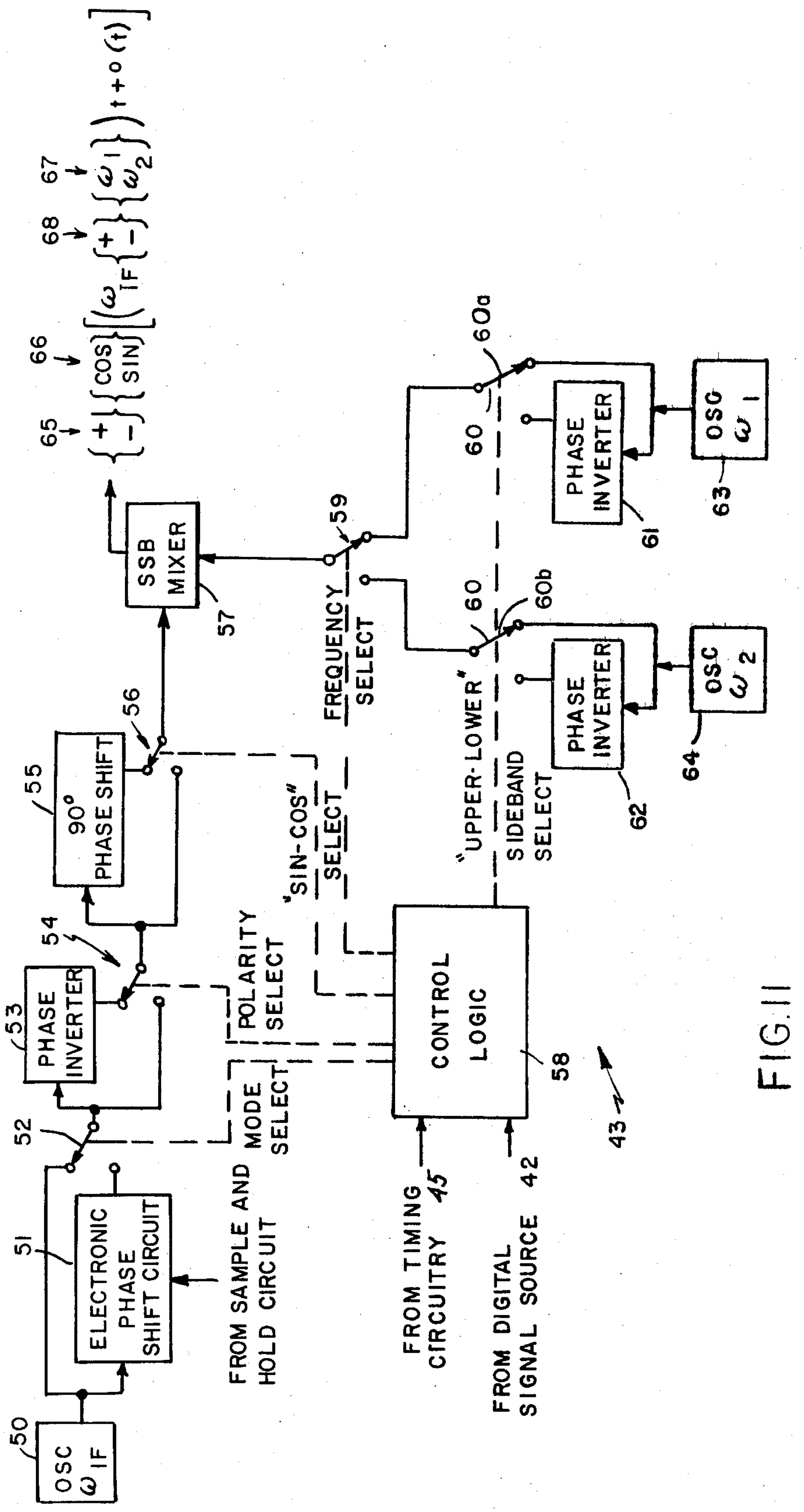
Figure 14:
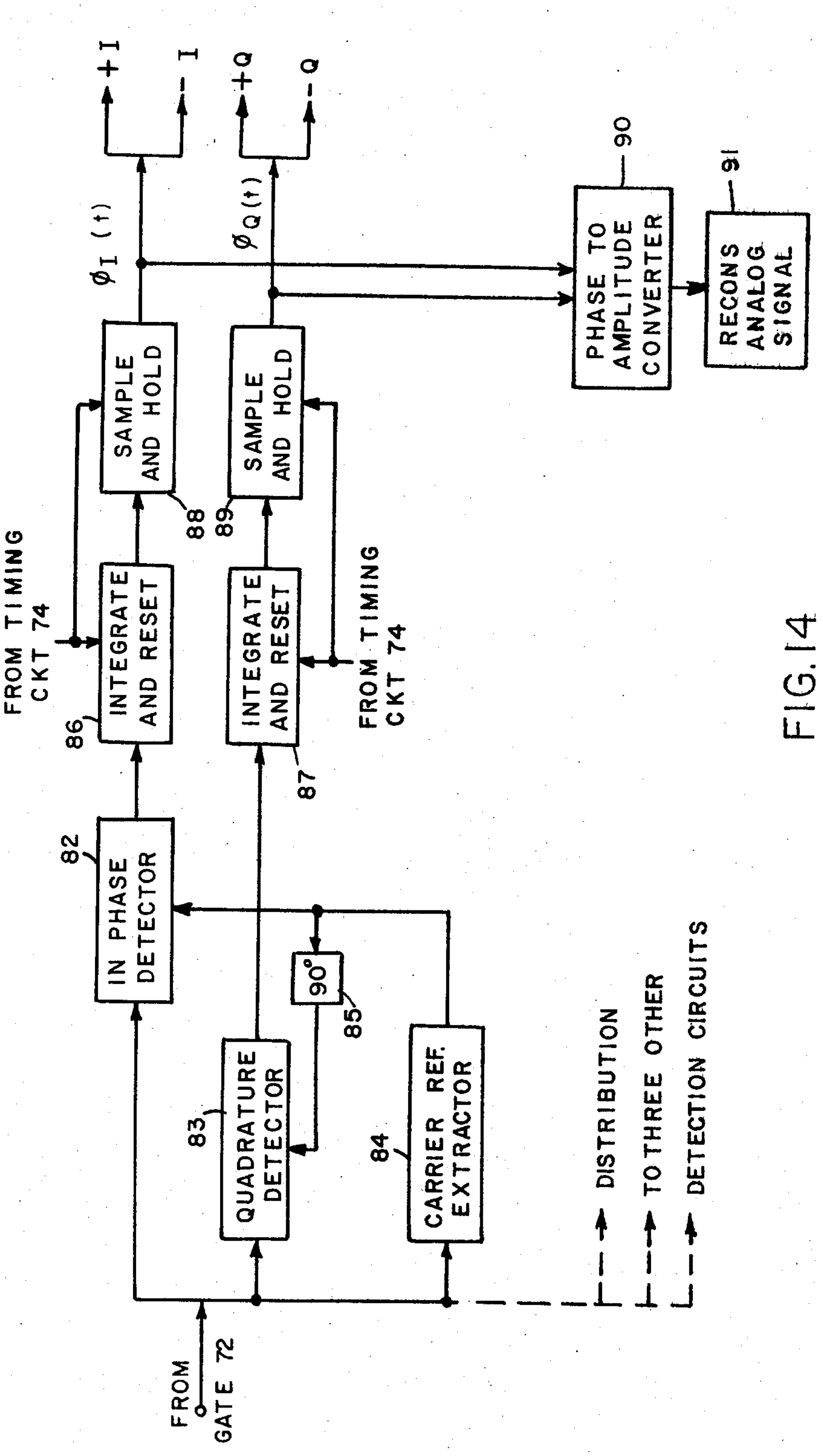
Figure 15:
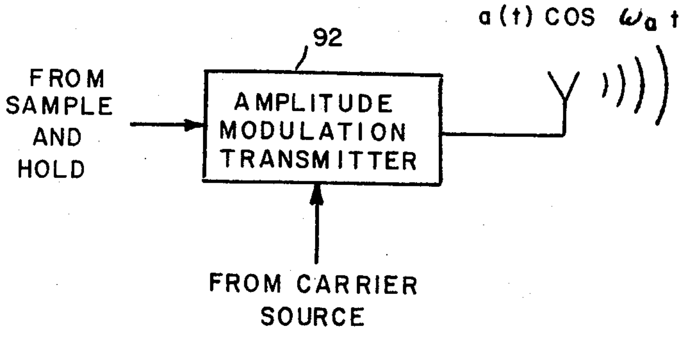
Figure 15A:
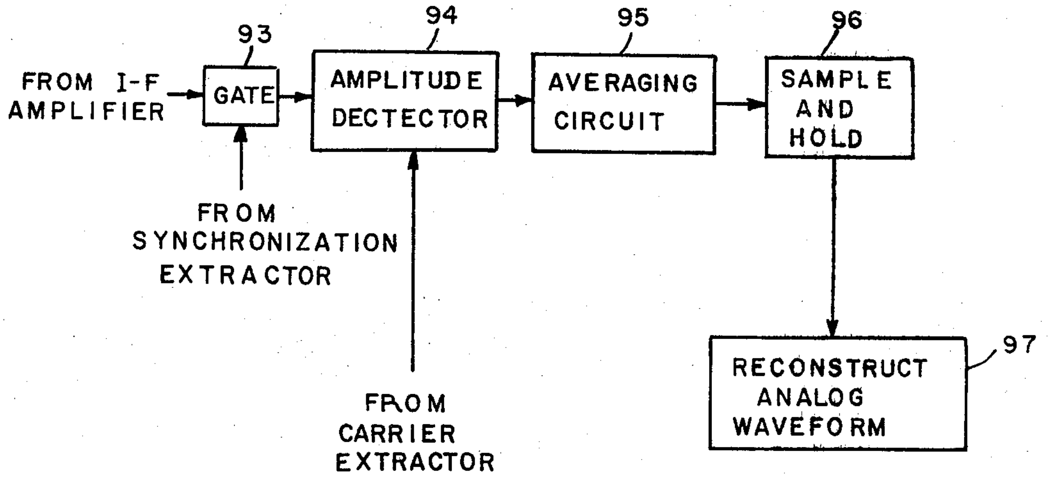

FIGS. 4, 5, 6, and 7 depict the waveform of signals obtained at various points with the receiver system of FIG. 1A;

FIG. 8 depicts a binary pulse waveform which can be transmitted by the system of the invention;

FIG. 9 depicts the frame time interval within which analog and digital information is transmitted by the system of the invention;

FIG. 10 depicts a block diagram of another embodiment of the transmitter system of the invention for use with analog and digital signals;

FIG. 11 depicts a block diagram of one particular embodiment of the hybrid modulator of the system of FIG. 10;

FIG. 12 depicts a block diagram of one particular embodiment of a receiver system of the invention for use with analog and digital information;

FIG. 13 depicts a block diagram of a portion of the receiver system shown in FIG. 12;

FIG. 14 depicts a block diagram of an exemplary detection circuit of the system of FIG. 13; and FIGS. 15 and 15A depict alternate embodiments of the transmitter and receiver system shown in FIGS. 1 and 1A.

Figures 2, 3:
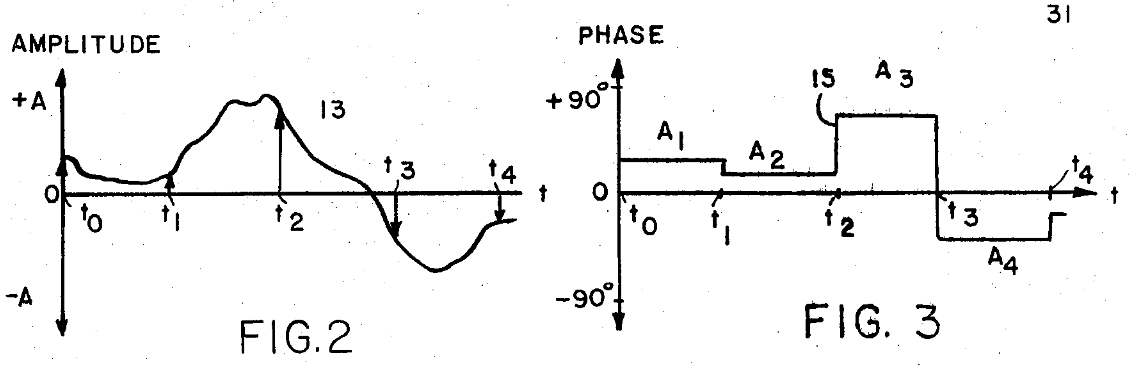
FIG. 2 depicts an analog waveform signal for use with the system of FIG. 1.
FIG. 3 depicts a pulse waveform signal derived from the analog waveform signal of FIG. 2.

In FIGS. 1 and 1A the transmitter and receiver systems are shown relatively broadly by the block diagram therein. Thus, the transmitter 10 comprises a source 11 of analog signals which are in the form, for example, of an analog waveform 13 as shown in FIG. 2. Such input analog signal, for example, may be obtained from the output of a frequency division multiplex unit which supplies an analog signal from a plurality of input analog signal channels (e.g., voice channels) in a well known manner. Analog waveform 13 has an amplitude which continuously varies as a function of time $t$ between the levels ±A as shown in the latter figure. A sample and hold circuit 12 provides periodically generated samples of analog waveform 13 at times indicated on the time scale $t$ of FIG. 2 as $_0$, $t_1$, $t_2$, $t_3$, $t_4$, . . . etc., the intervals between such samples being equal. The amplitude of the sampled signal at each sample point is then held at the sampled level for the entire time interval from one sample time to the next. Thus, the amplitude at $t_0$ is held at the sampled level $A_1$ as shown in FIG. 3 over the interval from $t_0$ to $t_1$. Accordingly, the amplitude $A_2$ of the sample at $t_1$ is held over the interval $t_1$ to $t_2$, the amplitude $A_3$ is held from $t_2$ to $t_3$, the amplitude $A_4$ is held from $t_3$ to $t_4$, . . . etc. Thus, a signal waveform 15 in the form of rectangular pulses, as shown in FIG. 3, is generated at the output of sample and hold circuit 12.

In the preferred embodiment of the invention shown, signal waveform 15 is fed to a phase modulation transmitter 16 which is also fed by a suitable carrier frequency source 17 to produce a phase modulated output signal at transmitting antenna 14, as shown in FIG. 1. The operation of phase modulated transmitter 16 is well known to those in the art and the form of the output signal therefrom as fed to transmitting antenna 14 can be represented as:

$$a \cos[\omega_a t + \phi(t)]$$

where $a$ is the amplitude thereof, $\omega_a$ is the carrier frequency and $\phi(t)$ is the phase of the output signal which is determined by the amplitude of the signal from sample and hold circuit 12.

The output signal is, thus, phase modulated by the amplitude of signal 15 so that the phase $\phi(t)$ is determined by the amplitude values $A_1$, $A_2$, $A_3$, $A_4$, . . . etc. and the phase $\phi(t)$ changes accordingly from one pulse time interval to time the next in accordance therewith in a well-known manner. The phase modulation may be arranged so that $(t)$ is caused, for example, to vary between ±90° (effectively corresponding to ±A) as shown in FIG. 3.

Since the output signal is then transmitted through a multipath transmission channel, the signal received at receiver 18 of FIG. 1A is a combination of a plurality of signals of different energy content, each of which travels along a different path in the medium so that each is received at receiver 18 at a slightly different time. For example, a first such signal may represent a direct path transmission and, hence, be of the following form, as transmitted.

$$a \cos[\omega_a t + \phi(t)]$$

Other signals which are delayed in time have different amplitudes (i.e., different energy contents) than that of the direct path signal and may be of the forms:

$$b \cos[\omega_a(t - \tau_a) + \phi(t - \tau_a)]$$

$$c \cos[\omega_a(t - \tau_b) + \phi(t - \tau_b)] \ldots, \text{etc.}$$

where $b$, $c$, . . . etc. represent the amplitudes thereof and $\tau_a$, $\tau_b$, . . . etc. represent the time delays for each signal.

Figures 4, 5:
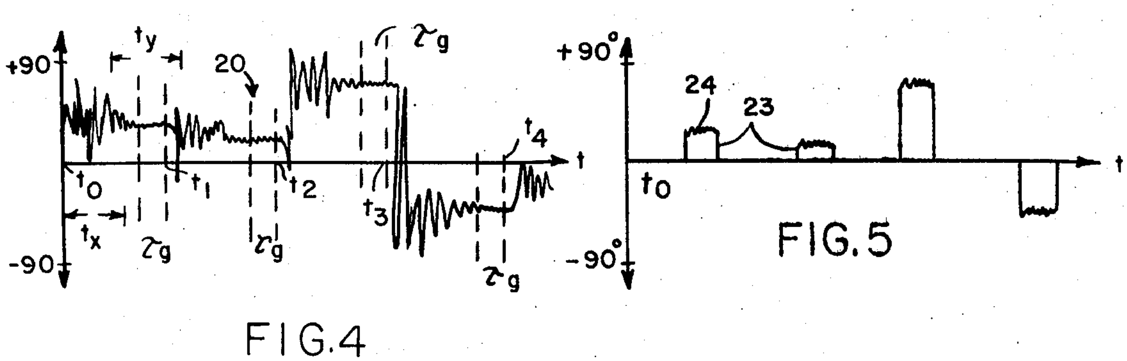

The received signals are appropriately amplified in IF amplifier 19 and the output thereof may be represented, for example, by a signal 20 of the form shown in FIG. 4, for example, (where for clarity the carrier signal is not shown). Thus, it can be seen that the leading portions of the signal at each pulse time interval are so distorted that it is difficult to determine the true relative phase values of the transmitted signal thereof at each interval. The distortion introduced by the multipath transmission is relatively strong over the initial, or leading, portion of each interval, arbitrarily designated, for example, as $t_x$ in FIG. 4, while the remaining portion of each said pulse time interval, arbitrarily indicated as $t_y$, is relatively less affected by the multipath transmission. The amplified IF signal therefore is suitably gated by a gate circuit 22 so that only a selected portion of the signal during the time $t_y$ in each pulse time interval, as indicated by $\tau_g$, is permitted to pass through gate 22. Thus, the output of gate 22 is a waveform as shown in FIG. 5 (where for clarity the carrier is not shown), comprising a plurality of carrier modulated pulses 23 each of which represents the selected portion of the received signal during each successive pulse time interval, which pulse portion is sufficiently removed from the leading portion of the signal during each such interval so as to be less affected by any multipath distortion which is introduced during transmission. The level of each of the pulses 23 represents the phase of the input signal which has been so selectively gated and has superimposed thereon a noise component 24 due to internally generated noise of the receiver equipment itself.

Figures 6, 7:
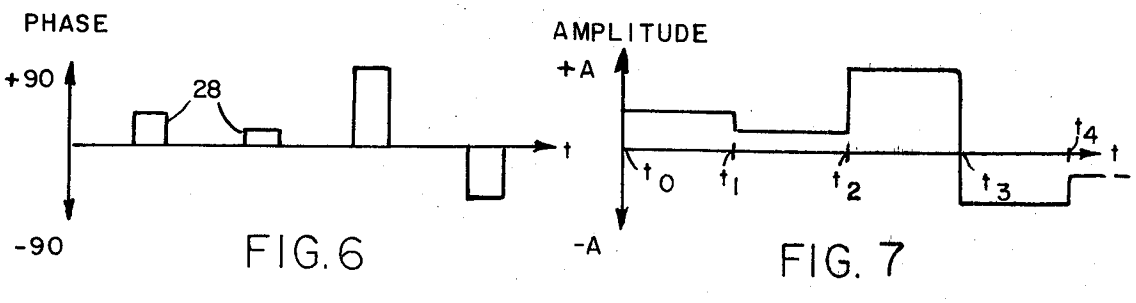

The carrier modulated pulses 23 are then fed to a synchronous detector 25 which is also fed from an appropriate carrier extractor circuit 26 so as to remove the carrier and to provide sets of output pulses representing the in-phase and quadrature components of the received carrier relative to the in-phase and quadrature outputs of the carrier extractor 26, each set of which is substantially of the form shown in FIG. 5, such in-phase and quadrature pulses being thereupon fed to averaging circuits 27, which may be in the form of suitable resettable integrator circuits, so as to average out, and effectively remove, the noise components 24 thereof and to produce relatively clean signals of the form of pulses 28 as shown in FIG. 6. The output pulses from averaging circuits 27 are then fed to suitable sample and hold circuits 29 which produce inphase and quadrature rectangular pulse components of the phase information over time intervals $t_0$ to $t_1$, $t_1$ to $t_2$, $t_2$ to $t_3$, $t_3$ to $t_4$ . . . , etc. corresponding to the pulse time intervals of the original signal shown in FIG. 3, the amplitudes of such rectangular pulse components being equal to the amplitudes of the selected in-phase and quadrature pulses 28. Such signals are then fed to appropriate circuitry for converting the phase information to amplitude information in a suitable phase to amplitude converter 30 which, for example, computes the quantity:

$$\phi = \tan^{-1} \frac{\text{(quadrature component)}}{\text{(in-phase component)}}$$

Thus, the signal waveform in FIG. 7, representing the desired amplitude information as shown in FIG. 3, is effectively reproduced at the output of converter 30. The output of phase to amplitude converter 30 can be used appropriately to reconstruct analog waveform 13, as shown by reconstruction circuit 31 in a manner well known to those in the art.

Appropriate time synchronization circuitry 32 must be used in order appropriately to trigger gate 22. The information needed for such time synchronization is determined in a well known manner from the input received signal via time synchronization extractor 32 as shown in FIG. 1A.

Thus, the transmitter-receiver system described in FIGS. 1 and 1A, the functions of which are made more clear by considering the waveforms of FIGS. 2–7, is able to transmit analog information over a multipath transmission channel without introducing appreciable intermodulation effects which so distort the signal as to prevent the accurate reproduction of such analog information at the receiver.

In summary therefore, the communication of analog signal information includes the generation, from samples of such information, of a pulse amplitude modulated signal in which the pulse amplitudes are used to phase modulate an appropriate carrier signal, the phase modulation thereby effectively representing the sampled amplitudes of the original analog waveform signal. Such phase modulated signal is transmitted via the multipath channel and selected portions of the received signal are examined during each corresponding pulse time interval, the selected portions being sufficiently removed from the leading portions of each pulse time interval so as to avoid the multipath effects. The selected signal portions are thereupon phase detected and appropriately processed to remove receiver generated noise components to produce signals having amplitudes corresponding to the phases which have been transmitted during each pulse time interval. Such signals are appropriately sampled and held so as to reconstruct the phase signal of the transmitter, and such signal is then appropriately converted from a phase representative signal to an amplitude representative signal so that the original analog waveform can be reconstructed.

Such a process readily adapts itself also to the transmission of digital information together with analog information, which digital information, for example, may be of the binary type, wherein a sequence of pulses 33, as shown in FIG. 8, each pulse having a constant amplitude and one of two polarities, is generated by a digital information source. Such binary pulses are appropriately combined with the analog signals as discussed below to produce a hybrid modulated signal containing both analog and digital information which signal can be suitably demodulated at the receiver to reproduce the original data. In the hybrid process, the analog plus digital modulated signal comprises a plurality of periodic frame intervals of time within which both the analog and digital information is transmitted. In a first described embodiment, for example, the analog modulated information is transmitted during a first portion (e.g., the first half) of each such frame time interval and the digital modulated information is transmitted over a second portion (e.g., the second half) of each such frame time interval. The frame time intervals during which the analog and digital information are alternately transmitted in such embodiment is representatively shown in FIG. 9 as an interval of time having a duration 2T, with the analog information being transmitted during the first half (i.e., over a time duration T) of each frame interval and the digital information being conveyed over the second half (i.e., also over a time duration T) of each frame interval. The use of such frame time intervals in the hybrid transmitter and receiver is discussed more fully with reference to FIGS. 10 and 11.

In FIG. 10 such a hybrid transmitter is generally shown as comprising a source 40 which produces an analog signal and a source 42 which produces a digital signal. Such digital signal, for example, may be obtained from the output of a time division multiplex unit which supplies a digital signal from a plurality of input digital signal channels ( e.g., digitized voice channels) in a well known manner. The analog signal, as shown in the transmitter of FIG. 1, is appropriately processed by a sample and hold circuit 41 to produce a series of pulses, the amplitudes of which correspond to the sampled amplitudes of the input analog signal. The output of sample and hold circuit 41 is fed to a hybrid modulator 43 which produces a modulated output which, during each frame time interval, includes a phase modulated signal representative of the analog signal during the first half of each frame time interval. The digital signal is also fed to modulator 43 which produces a frequency modulated and phase modulated signal representative of the digital signal during the second half of each frame time interval. This latter modulation process is sometimes referred to as frequency shift keyed (FSK) and phase shift keyed (PSK) modulation. The modulation process is described in more detail below. A suitable clock 44 is used to trigger appropriate timing circuitry 45 to begin the sample and hold circuit operation and also to synchronize the modulating operation of the hybrid modulator to produce the combined analog and digital modulated signals within each frame time interval. The modulated signal is then transmitted via transmitter amplifier 46 to an appropriate antenna 47 for transmittal through the multipath transmission channel.

The operation of hybrid modulator 43 is discussed in more detail with reference to FIG. 11, wherein a suitable hybrid modulator is shown for modulating analog input information and for modulating digital information which consists, in one form, for example, of video binary pulses at a rate of four bits during each interval 2T. As discussed above in the particular embodiment under consideration, the purpose of hybrid modulator 43 is to produce a signal which contains the analog information in the first half of each frame time interval and the digital information in the second half of each frame time interval. The output signal of modulator 43 will in any case be of the general form:

$$\{\pm\}\begin{Bmatrix}\cos\\ \sin\end{Bmatrix}\left[\left(\omega_{IF}\{\pm\}\begin{Bmatrix}\omega_1\\ \omega_2\end{Bmatrix}\right)t+\phi(t)\right]$$

where the symbols $$\{\pm\}\begin{Bmatrix}\cos\\ \sin\end{Bmatrix}\begin{Bmatrix}\omega_1\\ \omega_2\end{Bmatrix}$$

represent alternate signal characteristics which are selected in accordance with the digital modulation process, and $\phi(t)$ represents the phase selected in accordance with the analog modulation process.

Thus, hybrid modulator 43 comprises an intermediate frequency oscillator 50 producing an output signal at a frequency $\omega_{IF}$ which is fed to an electronic phase shift circuit 51 and to one terminal of a two-position switch 52, the other terminal of which is connected to the output of phase shift circuit 51. The common terminal of switch 52 is connected to a phase inverter 53 and to one terminal of a two-position switch 54, the output of phase inverter 53 being connected to the other terminal of switch 54, the common terminal of which is connected to the input of a 90° phase shift circuit 55 and to one terminal of a two-position switch 56. The other terminal of switch 56 is connected to the output of 90° phase shift circuit 55, while its common terminal is connected to the input of a single sideband mixing circuit 57, the output of which represents the modulated output of the hybrid modulator 53.

The digital data from a digital signal source 42 is fed to a control logic circuit 58 which controls the operation of switches 52, 54 and 56 as well as the operation of additional switches 59 and 60, the operations of which can be described with reference to oscillator generating circuits 63 and 64.

The latter circuits produce signals having frequencies $\omega_1$ and $\omega_2$, respectively, each of which is fed to phase inverters 61 and 62, respectively. Oscillator signal $\omega_1$ is also fed to one terminal of a first two-position switch element **60*a* of a dual-ganged switch 60 while the output of oscillator 64 is fed to one terminal of a second two-position switch element 60*b* of dual-ganged switch 60, as shown. The other terminal of switch element 60*a* is connected to the output of phase inverter 61, while the other terminal of switch element 60*b* is connected to the output of phase inverter 62. The common terminal of switch element 60*a* is connected to one terminal of two-position switch 59, while the common terminal of switch element 60*b* is connected to the other terminal of switch 59. The common terminal of switch 59 is in turn connected to single sideband mixer 57, as shown. The input signal form timing circuitry 45 is also fed to control logic circuitry 58 to control the operation of switches 52, 54, 56, 59, and 60 which in turn suitably control the modulation process as desired. The operation of hybrid modulator 43** can now be described.

During the first half of each frame time interval 2T, as shown with reference to FIG. 9, switch 52 is placed in its alternate position from that shown in FIG. 11, that is its common terminal is connected to the output of phase shift circuit 51 to provide the analog mode of operation. Switches 54 and 56 are also placed in their alternate positions so that the output of phase shift circuit 51 is fed directly to single sideband mixer 57. During such portion of the frame time interval, switches 59 and 60 may be held in their positions as shown in FIG. 11 so that the $(+\ \omega_1)$ signal is fed to single sideband mixer 57. Thus, the output signal at mixer 57 during such portion of the frame time interval can be expressed as a signal of the form:

$$\sin\left[\omega_a t+\phi(t)\right]$$

where $\omega_a=(\omega_{IF}+\omega_1)$. The phase of such signal $\phi(t)$ is determined by the output of phase shift circuit 51 in accordance with the analog information supplied thereto from the output of a sample and hold circuit as discussed above with reference to FIG. 1. The signal from single sideband mixer 57 then represents the analog modulated information during the first half of the frame time interval.

During the last half of each frame time interval, the digital information can be used to modulate the output signal as follows. In the example under discussion it is assumed that four bits of digital information are to be transmitted during each frame time interval so that, as is well known, it is necessary to provide 16 different conditions in order to represent such digital data. Thus, during the last half of each frame time interval, switch 52 is placed in its position as shown in FIG. 11 to provide the digital mode of operation and the four bits of digital information are used appropriately to control the positions of switches 54, 56, 59 and 60 via control logic circuitry 58. The output signal during this portion of the frame time interval of output signal can be represented as indicated in FIG. 11 as a signal of the form previously discussed above. For convenience, the phase $\phi(t)$ is made zero during the digital modulation portion of each frame time interval so that the output signal during the digital modulation process can be represented as:

$$(\pm)\begin{pmatrix}\cos\\ \sin\end{pmatrix}\left[\omega_{IF}(\pm)\begin{pmatrix}\omega_1\\ \omega_2\end{pmatrix}\right]t$$

Thus, switch 54 is used to control the polarity of the output signal, as indicated at position 65 in the output signal representation at the output of modulator 57 in FIG. 11. Switch 56 determines whether the output signal is of "cos" or "sin" form (i.e., whether the phase of the overall signal is 0° or 90°), as indicated at position 66 of the output signal representation. Switch 59 determines which oscillator signal (i.e., a signal with a frequency of either $\omega_1$ or $\omega_2$) is utilized as the sideband signal, as indicated at position 67 of the output signal representation. Finally, the dual-ganged switch 60 determines the sign of the oscillator signal which has been so selected by switch 59, so as to provide either an upper or a lower sideband signal, as indicated at position 68 of the output signal representation. Any one of 16 conditions are, thus, determined by the input digital signal information so that the output signal is effectively modulated with respect to its frequency and phase characteristics. Thus, the modulated signal during the last half of the frame time interval has one of four possible frequencies [(i.e., $(\omega_{IF} \pm \omega_1)$ or $(\omega_{IF} \pm \omega_2)$ ] with one of four possible phases at each frequency (i.e., ± cos or ± sin).

Accordingly, the transmitter produces a modulated output signal which represents combined analog and digital input information which information is thereupon appropriately demodulated at the receiver of the system after the transmitted signal has passed through the multipath transmission medium. Such a receiver is now described with reference to FIGS. 12, 13, and 14.

In FIG. 12 the received signal (actually, a plurality of signals each transmitted to the receiver along a different path in the multipath medium as discussed above) is appropriately received at antenna 70 where it is fed to a suitable r-f amplifier 71, the output of which is fed both to a timing gate 72 and a time synchronization subsystem 74, the operations of which are described in more detail below with reference to FIG. 13. Timing gate 72 is used to select a portion of the output signal during a selected gate time interval during each pulse time interval in both the analog and digital modulated signal halves of each frame time interval, which gated portion is sufficiently removed from the leading portion of the signal during each pulse time interval so as to avoid the multipath effects which occur at the beginning of each such pulse interval. The timing gate is appropriately synchronized with the incoming signal by time synchronization subsystem 74. The selected gated portions are thereupon fed to hybrid demodulator 73 for reproducing both the analog signal and the digital signal from the modulation data contained therein. The operation of the demodulator is suitably timed also by the use of time synchronization subsystem 74. Thus, the output of the demodulator, the operation of which is described in more detail below with reference to FIG. 13, provides signals for the reconstruction of both the analog and digital signal information originally arising at the transmitter from sources 40 and 42.

In FIG. 13 the demodulator 73 has generally a similar form to that described with reference to FIG. 1A, although for demodulating the digital information the phase detection must be accomplished at each of the four frequencies which are utilized. The output signal from gate 72 is fed to a plurality of phase detection circuits 75–78, the outputs of which represent the phases derived from each gated portion of the received signal at each of the frequencies involved. Since the phase of the transmitted signal will generally have either, or both, an in-phase component and a quadrature component, the detection circuitry in FIG. 13 is arranged to produce two outputs from each circuit representing the in-phase components $I_1$, $I_2$, $I_3$ and $I_4$ and the quadrature components $Q_1$, $q_2$, $Q_3$ and $Q_4$ at each of the frequencies involved. In the case where the digital information is to be demodulated, the detectors will detect either an inphase component (±sin) or a quadrature component component (±cos), while, for analog information, both components will normally be present at the frequency selected. The outputs of detection circuits 75–78 during the digital mode of demodulation are fed to an appropriate comparator circuit 79 which determines the presence and polarity of an in-phase component (i.e. ±sin) or a quadrature component (i.e., ±cos) at each of the four frequencies so as to produce the digital information which is supplied at the output of the comparator.

Since the analog information in the example under discussion is transmitted at only a single fixed frequency [for example, at a frequency $(\omega_{IF} + \omega_1)$], only the in-phase and quadrature components at such frequency need be detected. During the analog demodulation process, such components are suitably combined and fed to phase to amplitude converter as described with reference to FIG. 1A to reproduce the analog information during the analog portion of each frame time interval. The operations of the comparator and phase to amplitude converter circuitry are appropriately timed by the time synchronization subsystem 74 for this purpose. The operations of detection circuits 75–78 and comparator and phase to amplitude converter circuits 79 and 80 are described more completely with reference to FIG. 14 where such operation at a particular frequency is described, similar operations occurring for the remaining three frequencies involved.

Thus, in FIG. 14 the input signal from gate 72 is fed to an in-phase detector 82 and a quadrature detector 83 so that the in-phase and quadrature phase components are derived at the outputs thereof. Such detectors are appropriately fed by a carrier reference extractor circuit 84 which is fed in phase to the in-phase detector 82 and 90° out of phase to quadrature detector 83 via a 90° phase shift network 85. The outputs of the in-phase and quadrature detectors are each appropriately fed to an averaging circuit, shown as integrate and reset circuits 86 and 87 the operations of which are appropriately timed by timing circuit 74, so as to remove any noise components introduced by the receiver circuitry. The outputs of such circuits are fed to sample and hold circuits 88 and 89, respectively, for processing in a manner similar to that discussed with reference to FIG. 1A. Thus, the outputs of the sample and hold circuits are sequences of rectangular pulses which, during the analog demodulation process, have amplitudes representing the in-phase and quadrature phase components of the sampled analog information and, during the digital demodulation process, effectively have discrete amplitudes the polarities of which are determined by the input digital information. During the analog phase of the demodulation process, the outputs of sample and hold circuits 88 and 89 representing the in-phase and quadrature phase components, $\phi_I(t)$ and $\phi_Q(t)$, *respectively, are suitably combined in a phase amplitude converter 90, the output of which is then used to reconstruct the analog signal in well known appropriate reconstruction circuitry 91, as discussed above with reference to FIG. 1A.*

During the digital demodulation portion of the frame time interval, the outputs of sample and hold circuits 88 and 89 represent in-phase components of either polarity or quadrature components of either polarity depending on the digital information originally modulating the transmitted signal. Thus, effectively four output signals represented by either in-phase component, (±I) or either quadrature component (±Q) are obtained. These components plus similar components obtained from the other three detection circuits represent the sixteen information conditions which are then used to reconstruct the original digital information.

Although the hybrid system in the embodiment discussed above describes the division of each frame time interval into separate halves for the analog and digital information, one notable advantage of the system of the invention lies in its ability to provide an effective hybrid operation wherein both digital and analog can be transmitted simultaneously, i.e., both are transmitted in one or both halves of the frame time interval. Thus, in another embodiment of the invention it is possible to include additional digital information with the analog information in the analog modulation half of each frame in the example discussed above. For example, should the input digital signal comprise binary pulses at a rate of six bits in each frame time interval 2T, it is possible to include two of such information bits in that half of the frame time interval which contains the analog information. In the configuration as described, the additional two bits may be utilized during the analog modulation to select either sideband frequency with either polarity by control of switching elements 59 and 60 in accordance with the two-bit information content. In this way the additional two bits can be represented during that half of the frame time interval containing analog information by a choice of one of four possible frequencies on each of which the phase is modulated by the input analog information as before. Thus, the output signal during such half of the frame time interval can be represented by a signal of the following form:

$$\sin\left[\left(\omega_{IF}\{\pm\}\begin{Bmatrix}\omega_1\\ \omega_2\end{Bmatrix}\right)t+\phi(t)\right]$$

where the digital information is determined by the appropriate selection of either the upper or lower sideband of either frequency and the analog information is still represented by the phase $\phi(t)$ as before.

Alternatively, in still another embodiment of the invention, if analog and digital information are to be transmitted in both halves of the frame time interval, it is clear that two bits of digital information can be transmitted with the analog information in each half of the frame time interval, thus permitting the transmission over each 2T interval of four bits of digital information as well as twice the amount of analog information as would be transmitted when the analog information is transmitted during only one half of the frame time interval.

Further, the system may be adapted to transmit all digital information merely by using the digital modulation techniques as described above in each half of the frame time interval 2T. If eight data bits are to be transmitted over each 2T time interval, each half of the frame time interval may then be used to modulate the carrier signal with four bits, for example.

Although in the particular embodiments described above the analog information is used to phase modulate the transmitter carrier signal, the invention also may be embodied in another form in which the analog information is amplitude modulated, rather than phase modulated, onto the carrier signal. In this embodiment of the invention, for example, eight bits of digital data may be transmitted over each 2T time interval along with two analog samples over the same time interval. Furthermore, it is noted that in such an embodiment the frame time intervals for the analog and digital data need not be equal or even integral multiples of each other. Thus, the digital data and the analog samples can be transmitted at totally unrelated rates, if so desired. Such an embodiment would take a form similar to that shown in FIGS. 1 and 1A with modifications to portions thereof as shown, for example, in FIGS. 15 and 15A. In FIG. 15 the phase modulation transmitter of FIG. 1A has been replaced by an amplitude modulation transmitter 92 to provide an output signal of the form $a(t)\cos\omega_a t$, the amplitude $a(t)$ being appropriately modulated in accordance with the analog information.

In the receiver of FIG. 15A the signal received from gate 93 is then demodulated by an appropriate amplitude detector 94 the output of which is thereupon fed to averaging circuit 95 and sample and hold circuit 96 the output of the latter circuit being used to reconstruct the analog information in reconstruction circuit 97.

What is claimed is:

1. A system for communicating analog and digital information through a dispersive transmission medium, said system comprising:

a transmitter including means for generating a carrier signal;

hybrid modulating means responsive to said analog and digital information for modulating said carrier signal to produce a carrier modulated signal in which said analog and said digital information are transmitted periodically over selected frame intervals of time, said hybrid modulating means comprising:

means responsive to said analog information for producing periodic sampled amplitudes of said analog information;

means responsive to said periodic sampled amplitudes for modulating said carrier signal as a function of said periodically sampled amplitudes of said analog information;

means responsive to said digital information for modulating said carrier signal as a function of said digital information; and timing means for controlling said hybrid modulating means so that said carrier modulated signal includes both said analog and said digital information during each said frame interval of time; and means for transmitting said carrier modulated signal through said dispersive transmission medium; and a receiver including means for receiving said carrier modulated signal as transmitted through said dispersive transmission medium;

gating means for passing selected portions of said received signal during each said frame interval of time, said gating means being actuated to pass each said selected portions only during a selected time interval within each said frame time interval which is sufficiently removed from the leading portion of each said frame time interval to avoid time delay effects introduced by said dispersive transmission medium;

detecting means responsive to said selected portions of said received signal during each said frame interval of time for detecting said modulation characteristics thereof during each said frame interval of time;

time synchronization means responsive to said receiving means for synchronizing the operations of said gating means and said detecting means; and means responsive to said detected modulation characteristics during each said frame interval of time for reconstructing said analog information and said digital information.

2. A system in accordance with claim 1 wherein said modulating means responsive to said digital information modulates the frequency characteristics and the phase characteristics of said carrier signal;

said detecting means detects the frequency and phase modulation characteristics of said selected portions of said received signal; and said reconstructing means is responsive to said detected and said frequency and phase modulation characteristics.

3. A system in accordance with claim 1 wherein said modulating means responsive to said analog information modulates the phase of said carrier signal.

4. A system in accordance with claim 2, wherein said modulating means responsive to said analog information modulates the amplitude of said carrier signal;

said detecting means detects the frequency, phase and amplitude modulation characteristics of said selected portions of said received signal; and said reconstructing means is responsive to said detected frequency, phase and amplitude modulation characteristics.

5. A system in accordance with claim 1 wherein said timing means is adapted to control said hybrid modulating means to produce a carrier modulated signal in which said analog information is transmitted during one-half of said frame interval of time and in which said digital information is transmitted during the other half of said frame interval of time.

6. A system in accordance with claim 1 wherein said timing means is adapted to control said hybrid modulating means to produce a carrier modulated signal in which said analog information and a portion of said digital information are transmitted during one-half of said frame interval of time and in which another portion of said digital information is transmitted during the other half of said frame interval of time.

7. A system in accordance with claim 1 wherein said timing means is adapted to control said hybrid modulating means to produce a carrier modulated signal in which one portion of said analog information and one portion of said digital information are transmitted during one-half of said frame interval of time and in which another portion of said analog information and another portion of said digital information are transmitted during the other half of said frame interval of time.

8. A system in accordance with claim 3 wherein said modulating means responsive to said analog information includes means for sampling the amplitude of said analog information at discrete time intervals;

means responsive to said sampled amplitude information for producing a sequence of pulse signals having amplitudes during said discrete time intervals representative of said sampled amplitudes; and means responsive to said pulse signals for modulating the phase of said carrier signal in accordance with said amplitudes.

9. A system in accordance with claim 4 wherein said modulating means responsive to said analog information includes means for sampling the amplitude of said analog information at discrete time intervals;

means responsive to said sampled amplitude information for producing a sequence of pulse signals having amplitudes during said discrete time intervals representative of said sampled amplitudes; and means responsive to said pulse signals for modulating the amplitudes of said carrier signal in accordance with said amplitudes.

10. A system in accordance with claim 11 wherein said means responsive to said digital information includes means for selecting said modulating characteristics from a plurality of discrete frequencies and from a plurality of discrete phase characteristics.

11. A system in accordance with claim 1 wherein four bits of digital information may be used to modulate said carrier signal to produce a modulated carrier signal of the form $$(\pm)\binom{\cos}{\sin}\left[\omega_{IF}(\pm)\binom{\omega_1}{\omega_2}\right]t$$

where $\omega_{IF}$ is the carrier frequency, $\omega_1$ and $\omega_2$ are discrete frequencies, $$(\pm)\binom{\cos}{\sin}$$

are discrete phase characteristics.

12. A system for communicating analog information through a dispersive transmission medium, said system comprising a transmitter including means responsive to said analog information for sampling the amplitude thereof at discrete time intervals;

means responsive to said sampled amplitude information for producing a sequence of pulse signals having amplitudes during said discrete time intervals representative of said sampled amplitudes;

means responsive to said pulse signals for modulating a carrier signal in accordance with said amplitudes to produce an output signal for transmission through said dispersive transmission medium; and a receiver including means for receiving said transmitted signal;

gating means for passing selected portions of said received signal, said gating means being actuated to pass each said selected portion only during a selected time interval within each said discrete time interval which is sufficiently removed from the leading portion of each said discrete time interval to avoid time delay effects introduced by said dispersive transmission medium;

means for detecting the modulation characteristics of said received signal during each said selected portion;

means for producing a sequence of pulse signals having pulse time intervals corresponding to said discrete time intervals which pulse signals have amplitudes representative of said modulation characteristics of said received signal as detected during said selected portions; and means for reconstructing said analog information in response to said amplitudes of said sequence of pulse signals.

13. A system in accordance with claim 12 wherein said means responsive to said pulse signals modulates the phase characteristics of said carrier signal;

said detecting means detects the phase of said received signal; and the amplitudes of said pulse signals of said sequence of pulse signals are representative of said phase characteristics of said received signal.

14. A system in accordance with claim 12 wherein said means responsive to said pulse signals modulates the amplitude characteristics of said carrier signal;

said detecting means detects the amplitudes of said received signal; and said pulse signals of said sequence of pulse signals are representative of said amplitude characteristics of said received signal.

* * * * *